J. S. OLDS.
FISH BAIT OR LURE.
APPLICATION FILED JUNE 28, 1915.

1,209,641.                                Patented Dec. 19, 1916.

JAMES S. OLDS,
INVENTOR.
By George J. Oltsch
ATTORNEY.

UNITED STATES PATENT OFFICE.

JAMES S. OLDS, OF BENTON HARBOR, MICHIGAN, ASSIGNOR TO SOUTH BEND BAIT COMPANY, OF SOUTH BEND, INDIANA, A CORPORATION OF INDIANA.

FISH BAIT OR LURE.

1,209,641.  Specification of Letters Patent.  Patented Dec. 19, 1916.

Application filed June 28, 1915. Serial No. 36,755.

*To all whom it may concern:*

Be it known that I, JAMES S. OLDS, a citizen of the United States, residing at Benton Harbor, in the county of Berrien and State of Michigan, have invented certain new and useful Improvements in Fish Bait or Lures, of which the following is a specification.

The invention relates to an artificial bait or lure for fishing, preferably made of a buoyant material so as to float when not in action or when slowly moved when reeling in the same, but which will tend to dive beneath the surface and also have a wabbling motion when drawn more swiftly through the water.

The main object of the invention resides in the provision of a fish bait or lure which will have an erratic or irregular movement as same is drawn through the water, thereby more nearly resembling the action of a live minnow, so as to enhance its quality of attraction as a lure for game fish.

Further objects will hereinafter more fully appear from the detailed description of the bait.

Figure 1:
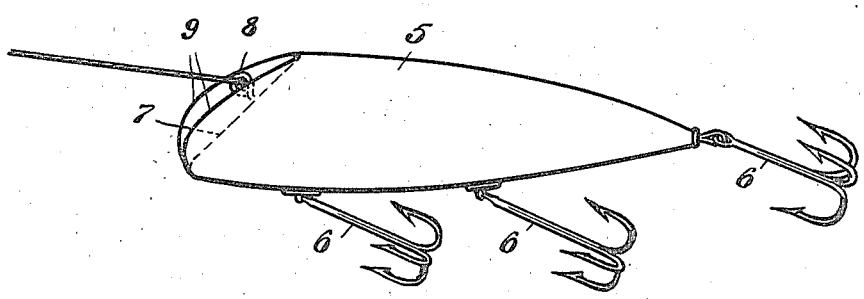
Figure 2:
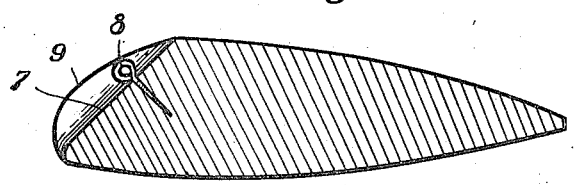
Figure 3:
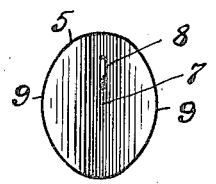

The invention in the preferred form of details will be described in the following specification, reference being had particularly to the accompanying drawings, in which:

Figure 1 is a side elevation of the improved bait or lure. Fig. 2 is a central longitudinal section of the body. Fig. 3 is a view of the forward end of the body.

The body 5 of the bait or lure is made so as to somewhat resemble the form of a minnow or other small fish, and preferably of a material having sufficient buoyancy so that same will float and support a number of hooks 6, when inactive or being slowly drawn through the water. The forward or head end of the body is constructed to provide a head, being for the purpose formed with a cylindrical cut on a line diagonal to the longitudinal median plane of the body, as clearly appears in Fig. 2. As a result of this formation the curved lines of the body are presented unbroken from end to end of the body and all indentations or breaks are avoided. Furthermore the head end has opposed deflecting side ridges extending forwardly of and in the plane of the body surface, the ridges coinciding with the body surface and with the surface of the cylindrical cut at the vertical longitudinal central plane of the body. It will thus be apparent that, by attaching a line to a screw eye 8 disposed above the horizontal median line of the body, any pulling action on the line so as to propel the bait through the water with some speed, will tend to raise the rear end of the body by virtue of the resistance of the water against the lower front end thereof, and presenting an inclined surface to the resistance of the water, cause the same to submerge and travel beneath the surface at a depth varying with the speed at which the bait is drawn.

The body 5 is substantially circular in cross-section, and by concaving the head end thereof as above described, there are formed oppositely disposed marginal ridges or wings 9, which project a considerable distance forwardly of the center line of the concaved surface, as plainly shown in Fig. 2. As said ridges or wings are disposed in a substantially vertical plane, the resistance of the water sidewise thereof, first against one and then the other, tends to impart a wabbling motion to the body. By thus fashioning the body both a diving and a wabbling bait or lure is produced, and which will closely simulate the movements of a live minnow or other small fish.

While the foregoing describes the preferred form of the invention, I desire it to be understood that I do not limit myself to the precise structure shown and described, as it is obvious that the same may be variously modified without departing from the spirit of the invention.

What is claimed is:—

A fish bait or lure, including a body having a head end formed by a cylindrical cut on a line diagonal to the longitudinal horizontal plane of the body and extending only between opposite curved surfaces of the body, whereby to preserve the longitudinal surface of the body unbroken from end to end and to provide at the head end deflecting side ridges forwardly of and in coincidence with the plane of the body surface.

In testimony whereof I affix my signature in presence of two witnesses.

JAMES S. OLDS.

Witnesses:
GEO. F. CUNNINGHAM,
MORACE S. EASTON.